(12) United States Patent
Williams et al.

(10) Patent No.: US 6,895,748 B2
(45) Date of Patent: May 24, 2005

(54) HYDROSTATIC TRANSMISSION HAVING A HYDRAULIC DISCONNECT

(75) Inventors: Douglas G. Williams, Bedford, IN (US); C. Paul Cox, Sellersburg, IN (US); Kevin L. Johnson, Douglas, GA (US)

(73) Assignee: Tecumseh Products Company, Tecumseh, MI (US)

( * ) Notice: Subject to any disclaimer, the term of this patent is extended or adjusted under 35 U.S.C. 154(b) by 23 days.

(21) Appl. No.: 10/392,684

(22) Filed: Mar. 20, 2003

(65) Prior Publication Data

US 2004/0182075 A1 Sep. 23, 2004

(51) Int. Cl.⁷ .............................................. F16D 31/02
(52) U.S. Cl. ...................................................... 60/494
(58) Field of Search ........................... 60/494, 489, 487

(56) References Cited

U.S. PATENT DOCUMENTS

| | | | |
|---|---|---|---|
| 3,360,933 A | 1/1968 | Swanson et al. ............... 60/53 |
| 4,094,433 A | 6/1978 | Numbers ................... 220/90.4 |
| 4,510,972 A | 4/1985 | Creedon ................ 137/625.28 |
| 5,010,733 A | 4/1991 | Johnson ........................ 60/453 |
| 5,052,511 A | 10/1991 | Hunt ........................... 180/305 |
| 5,074,195 A | 12/1991 | Ohashi et al. .................. 92/57 |
| 5,078,659 A | 1/1992 | von Kaler et al. ............. 475/78 |
| 5,094,077 A | 3/1992 | Okada .......................... 60/436 |
| 5,373,697 A | 12/1994 | Jolliff et al. ................... 60/454 |
| 5,664,465 A | 9/1997 | Okada et al. ............. 74/606 R |
| 5,701,738 A | 12/1997 | Eberle et al. ................. 60/435 |
| 5,794,443 A | 8/1998 | Shimizu ....................... 60/456 |
| 5,802,931 A | 9/1998 | Louis ....................... 74/606 R |
| 5,921,151 A | 7/1999 | Louis et al. ............... 74/606 R |
| 5,979,271 A | 11/1999 | Louis et al. ............... 74/606 R |
| RE36,807 E | 8/2000 | Okada .......................... 60/454 |
| 6,122,996 A | 9/2000 | Hauser et al. ................. 74/607 |
| 6,145,312 A | 11/2000 | Hauser et al. ................. 60/464 |
| 6,185,936 B1 | 2/2001 | Hauser et al. ................. 60/468 |
| 6,223,531 B1 | 5/2001 | Hauser et al. ................. 60/487 |
| 6,244,137 B1 | 6/2001 | Wigness ................... 74/606 R |
| 6,253,637 B1 | 7/2001 | Hauser et al. ................. 74/531 |
| 6,301,885 B1 | 10/2001 | Johnson et al. ............... 60/487 |
| 6,318,080 B2 | 11/2001 | Hauser et al. ................. 60/468 |
| 6,322,474 B1 | 11/2001 | Hauser ....................... 475/230 |
| 6,332,317 B1 | 12/2001 | Hauser et al. ................. 60/464 |
| 6,340,096 B1 | 1/2002 | Zerfas ............................ 222/1 |
| 6,397,594 B2 | 6/2002 | Hauser et al. ................. 60/487 |
| 6,401,568 B1 | 6/2002 | Hauser et al. ................. 74/607 |
| 6,422,109 B1 | 7/2002 | Jolliff et al. ................. 74/730.1 |
| 6,487,935 B2 | 12/2002 | Hauser et al. ................. 74/607 |

*Primary Examiner*—Edward K. Look
*Assistant Examiner*—Michael Leslie
(74) *Attorney, Agent, or Firm*—Baker & Daniels

(57) ABSTRACT

A hydrostatic transmission including a pump, a motor, and a center section provided with a conduit through which the pump and motor are in fluid communication and a valve. The pump, motor and center section are disposed in a housing having a plurality of walls which at least partially define a sump, the conduit being in fluid communication with the sump through the valve when the valve is open. A hydraulic disconnect mechanism is provided which includes a substantially rigid first portion, and a second portion operatively engaged with the first portion and being at least partially resilient. The valve is operably engaged with and opened by the second portion in response to the first portion being in an engaged position, and the valve is not operably engaged with the second portion when the first portion is in a disengaged position.

37 Claims, 12 Drawing Sheets

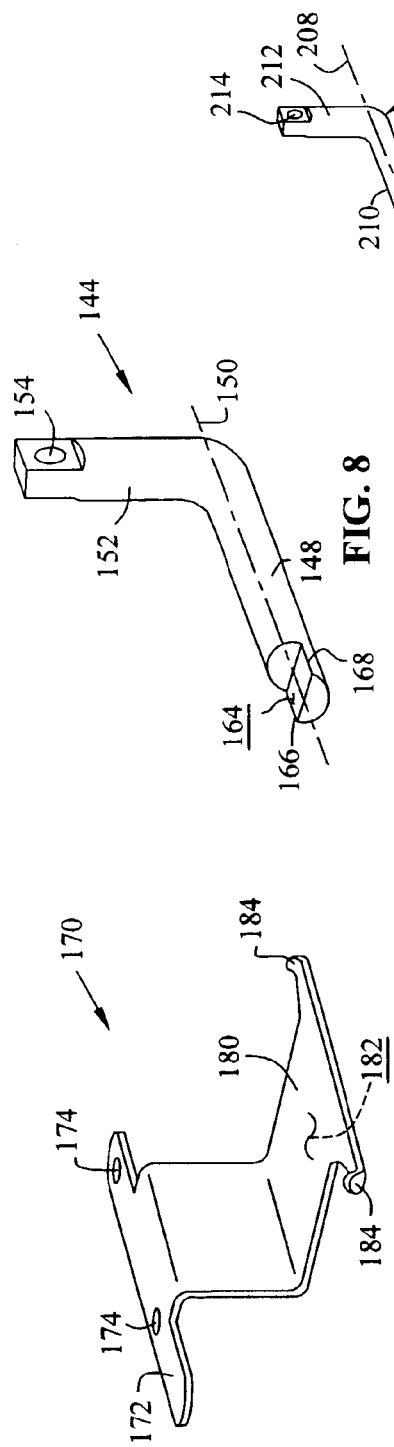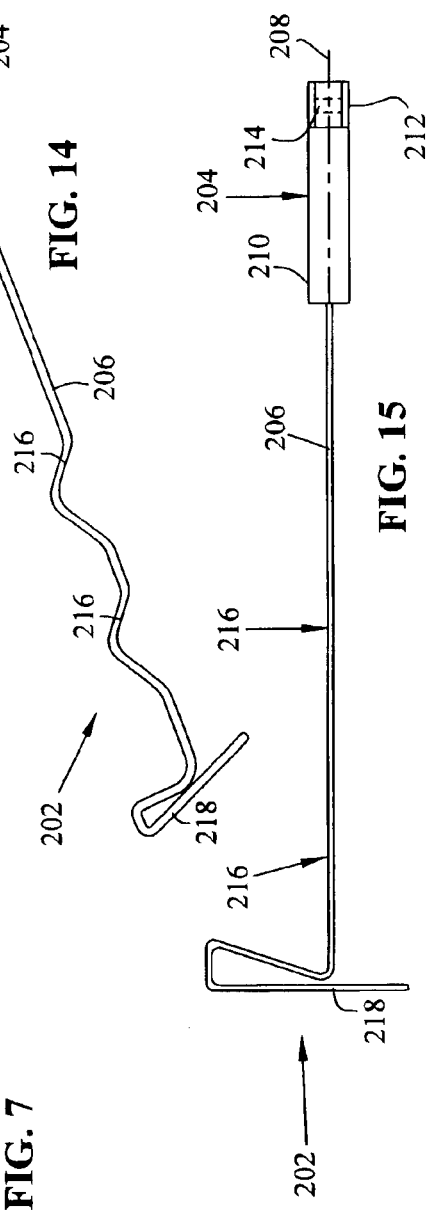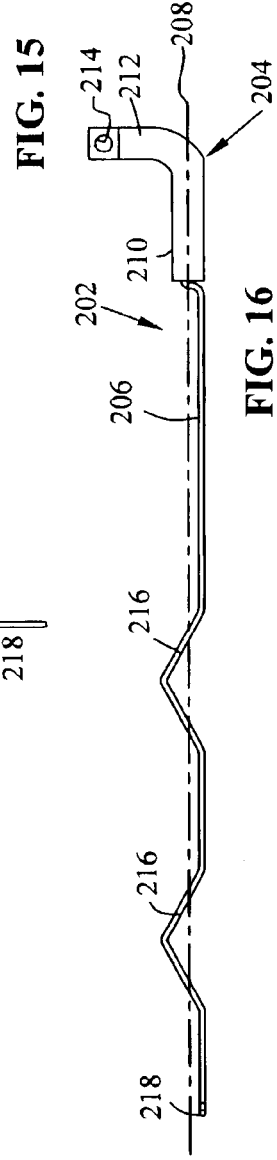

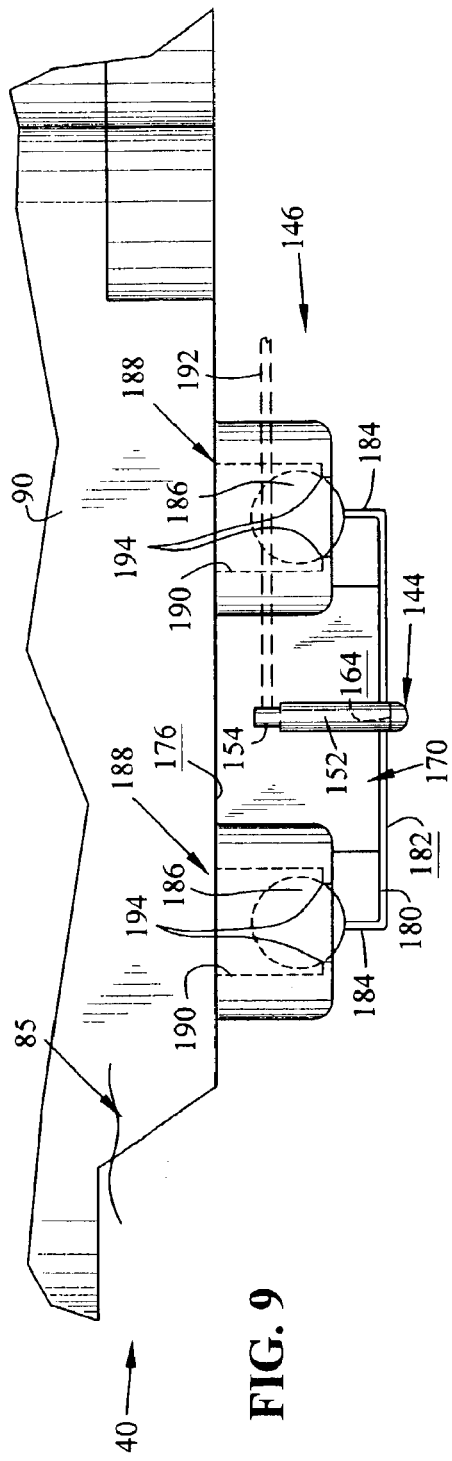
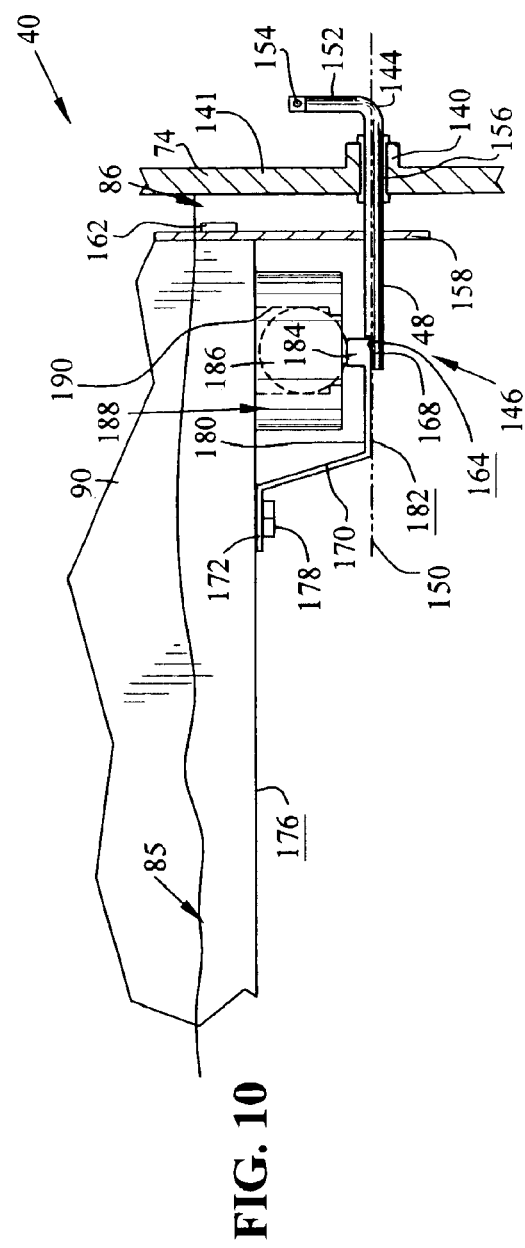
FIG. 9
FIG. 10

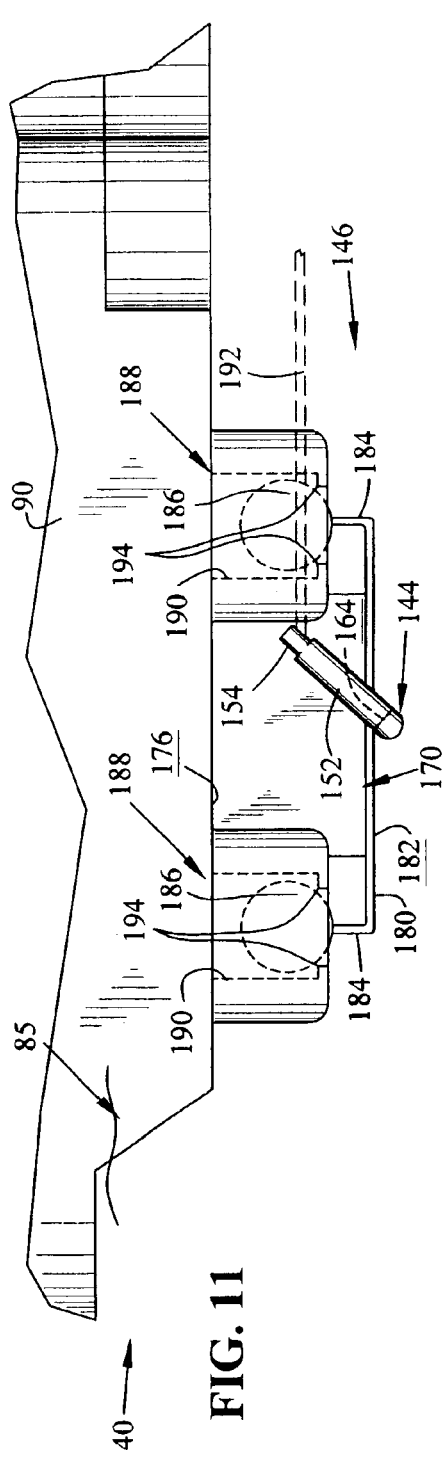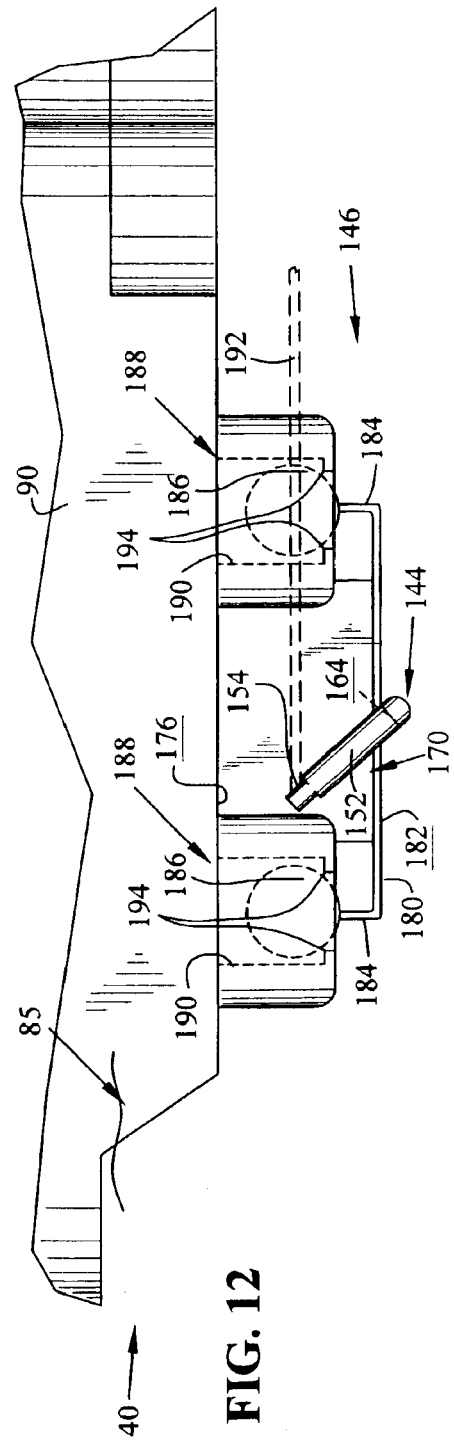

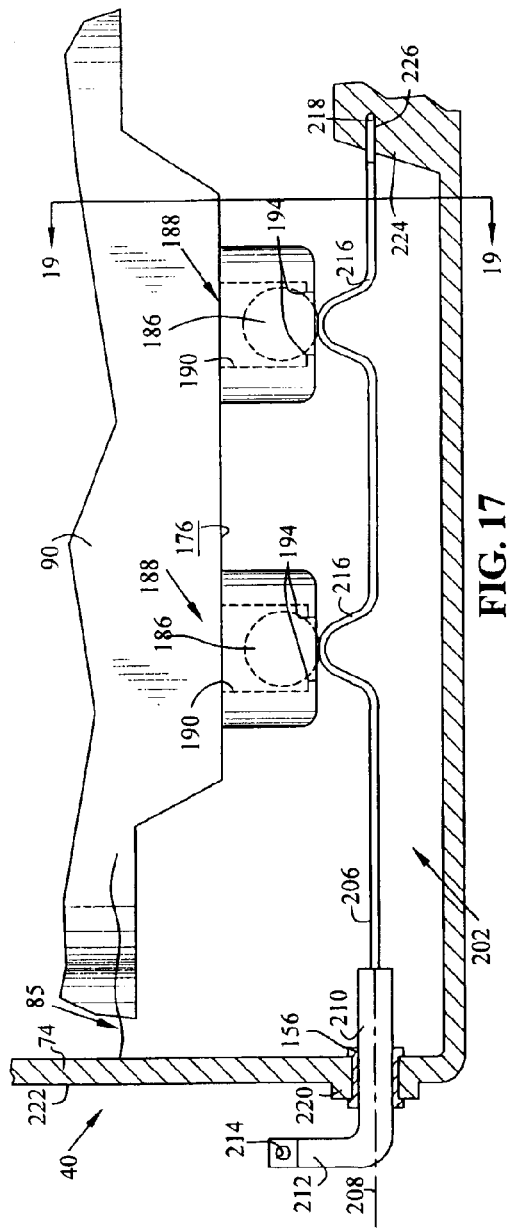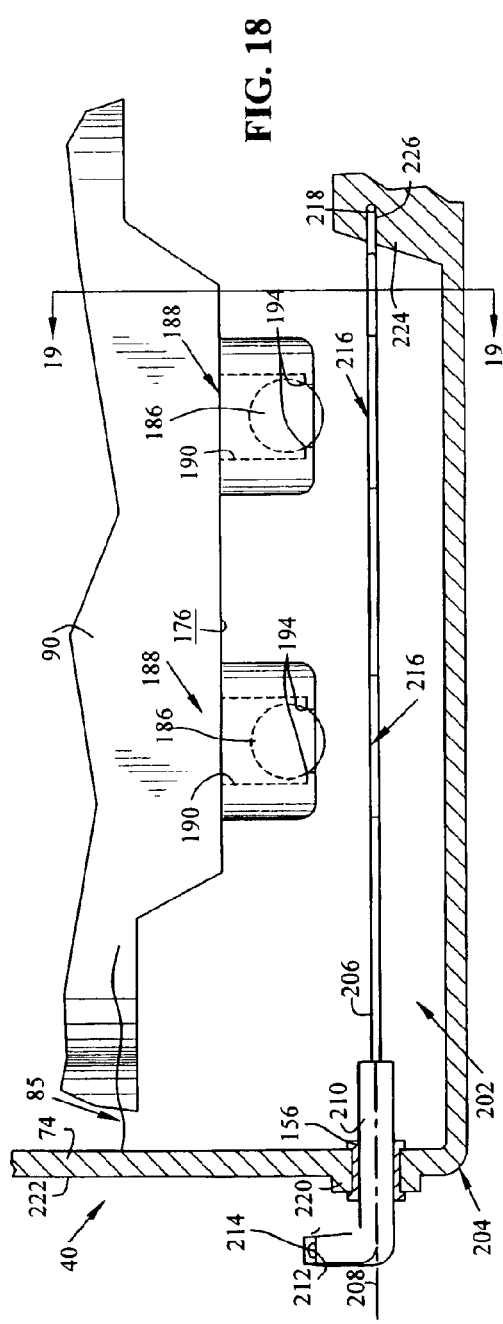

HYDROSTATIC TRANSMISSION HAVING A HYDRAULIC DISCONNECT

BACKGROUND OF THE INVENTION

1. Field of Invention

The present invention relates to hydrostatic transmissions intended primarily for use in the lawn and garden industry on tractors, mowers, snow throwers and other types of lawn and garden machines.

2. Description of the Related Art

Hydrostatic transmissions typically are provided with a rotating pump driven by an internal combustion engine, which pumps oil to a fluid motor. Rotary motion of the motor is induced by the fluid being received in the motor, and is transferred to a drive axle for propelling the vehicle. The pump is of variable displacement, and pumps the fluid to the fixed displacement motor at variable rates, which varies the rotational speed of the motor, and through different conduits, which determines the direction of motor rotation. As pump displacement changes between positive and negative, or forward and reverse, positions about the pump's neutral position, to respectively forwardly and reversely drive the motor, these two fluid conduits alternatingly conduct high pressure driving fluid from the pump to the motor, and low pressure return fluid from the motor to the pump during transmission operation. Adjusting the rotating pump's displacement to zero provides a neutral mode in which no fluid is pumped to the motor, and rotation of the motor is thus not induced. Such transmissions are well-known in the art, and may have pumps and/or motors which are of radial or axial piston design, examples of such transmissions being disclosed in U.S. Pat. Nos. 5,373,697 (Jolliff et al.), 6,301,885 (Johnson et al.), and 6,422,109 (Jolliff et al.), the complete disclosures of which are all expressly incorporated herein by reference.

Common applications for hydrostatic transmissions, which includes hydrostatic transaxles, are vehicles such as tractors, riding mowers, large area walk-behind mowers, larger snow throwers, and other types of self-propelled lawn and garden machines. Although such machines are self-propelled, they must often be moved manually, usually when the pump is not being driven, in order to move the machine about within garages or other confined spaces. Additionally, the machine may at some time require being pushed or pulled in the event of failure, including running out of gas, while in operation.

Vehicles having hydrostatic transmissions generally resist being pushed or pulled without first mechanically disconnecting the motor from the axle which it drives, or breaking the operative fluid engagement between the pump and motor. Otherwise, back-driving the motor through rotation of the axle tends to pump the oil in the motor backwards toward the pump. If the nonoperating pump is adjusted to have some displacement, the fluid back-flowing through one of the conduits between the pump and motor attempts to rotate the pump at some speed in one direction or the other. However, because the pump is typically still coupled to the nonrotating driveshaft of the engine, through a belt and pulleys, for instance, it resists being rotated and thus the vehicle resists being moved. Even if the pump (adjusted to have some displacement) and engine were uncoupled, the oil's resistance to flow through the hydrostatic circuit, particularly at low temperatures, can make manually moving the vehicle difficult. Moreover, if the pump is adjusted to have zero displacement, the fluid pumped by the back-driven motor would not be able to rotate the pump and flow through it. The oil the back-driven motor attempts to pump thus has nowhere to go, and again the vehicle resists being moved.

Above-mentioned U.S. Pat. Nos. 6,301,885 and 6,422,109 disclose means for mechanically disconnecting an axial piston motor from a gear train through which the motor and axle are operatively engaged. However, to facilitate pushing or pulling of vehicles having hydrostatic transmissions without first mechanically disconnecting the motor from the axle, it is known to provide the transmission with some means for allowing the fluid pumped by the back-driven motor to be directed out of the motor or the conduits and to an oil sump, rather than to allow this fluid to urge rotation of the pump. These means often include relief or dump valves between the fluid conduits and the oil sump. When opened, these valves allow fluid being pumped through either conduit (by the back-driven motor or perhaps by the pump) to freely flow into the sump, substantially emptying the hydrostatic circuit of fluid, and thereby taking the pump and motor out of operative fluid engagement with each other. Some embodiments of these dump valves are ball check valves which are normally biased by springs and/or pressurized fluid in the conduits into a closed, sealed state, and which are forced off their seats to place the conduits and the sump in fluid communication, thereby allowing fluid pumped by the back-driven motor to be expelled from the conduit(s) to the sump, and taking the pump and motor out of operative engagement. Such check valves also allow makeup fluid to be automatically drawn from the sump into the lower pressure conduit of the hydrostatic circuit as needed during transmission operation.

Above-mentioned U.S. Pat. No. 5,373,697 discloses (FIGS. 1 and 8) a bypass mechanism or hydraulic disconnect mechanism comprising a rigid metal plate which lies in a plane longitudinally-bisecting the pintle about which the radial piston pump and motor are disposed, and in which the two conduits are provided. Ball check valves are forced off of their seats by moving the rigid metal plate along the longitudinal axis of the pintle, fingers formed in the rigid plate being brought into engagement with the balls. Movement of the rigid metal plate is controlled manually, by rotating a rod extending normally through an oblong slot provided in the plate, the rod having an eccentric portion which slidably engages the edges of the slot. This bypass or hydraulic disconnect mechanism provides the advantage of being simple and easily-actuated manually, but may not be conveniently packaged in an axial piston-type hydrostatic transmission such as disclosed in above-mentioned U.S. Pat. Nos. 6,301,885 and 6,422,109. Such axial piston-type transmissions typically have a housing which partially defines a sump, and a center section or block to which the pump and motor are both rotatably attached. The center section has the fluid conduits formed therein and, in its bottommost surface, ports vertically extending to the conduits and containing check valves for allowing makeup fluid to enter the low pressure conduit from the sump during transmission operation. The space between the bottom surface of the center section block and the interior surface of the bottom wall of the housing is normally minimized to reduce transmission height, and affords insufficient room for packaging a vertically-oriented and vertically-moving rigid metal plate like that disclosed in U.S. Pat. No. 5,373,697.

Prior means for providing a hydraulic bypass or disconnect mechanism in an axial piston-type hydrostatic transmission are disclosed in U.S. Pat. No. 6,332,317 (Hauser et al.) which, as described above, provides ball check valves being placed in vertically-extending ports in the bottom surface of the center block, through which the conduits and sump may be placed in fluid communication. The bypass mechanisms of U.S. Pat. No. 6,332,317 provide non-manual means for pushing the balls upwardly off their seats with a horizontally-sliding plate moved by an electrical solenoid, or with an electromagnetically—actuated, vertically-moving horizontal plate or a ball-pushing member, or by electromagnetically lifting the steel balls themselves off of their seats. Although some of these hydraulic disconnect mechanism embodiments may be packaged in the small space normally available in the sump beneath the center section and above the interior surface of the bottom wall of the transmission housing, they all have the disadvantage of requiring electrical power, which may not always be available, and of being somewhat complex. U.S. Pat. No. 6,332,317 neither teaches nor suggests any means for manually-actuating the hydraulic bypass mechanisms it discloses.

A simple, manually-actuated hydraulic disconnect or bypass mechanism which does not rely on electrical power, and/or which may be suitably packaged in the sump, in the space between the center section and the housing wall in an axial-piston type hydrostatic transmission, is desirable.

SUMMARY OF THE INVENTION

The above-mentioned shortcomings of the prior art are overcome by the present invention, which provides a fluid bypass mechanism for a hydrostatic transmission in addition to, or in place of, the mechanical disconnect mechanism between the fluid motor and the axle. In axial piston hydrostatic transmissions to which embodiments of the present invention have been adapted, the hydraulic bypass selectively opens a pair of check valves located on the bottom of the transmission center block, thereby providing open fluid communication between the sump and the conduits, thereby allowing any fluid pumped by the back-driven motor to freely flow to the sump, whereby the pump is not urged to rotate.

Certain embodiments of the present invention provide a hydrostatic transmission including a hydraulic pump having an input, a hydraulic motor having an output, and a center section to which the pump and motor are rotatably mounted. The center section is provided with a conduit through which the pump and motor are in fluid communication, the pump and motor being hydraulically coupled when the pump and motor are in operative fluid engagement with each other through fluid in the conduit, and a valve with open and closed conditions. The pump, motor and center section are disposed in a housing having a plurality of walls which at least partially define a sump. The conduit is in fluid communication with the sump through the valve when the valve is open, during which the pump and motor are out of operative fluid engagement with each other, and the conduit is out of fluid communication with the sump through the valve when the valve is closed. A hydraulic disconnect mechanism is also provided which includes a first portion moveable relative to the center section and extending through a housing wall, the first portion being substantially rigid and having engaged and disengaged positions. The hydraulic disconnect mechanism also includes a second portion operatively engaged with the first portion and which is moveable relative to the center section, the second portion being at least partially resilient and having a part which is substantially immobile relative to the housing. The valve is operably engaged with and opened by the hydraulic disconnect mechanism second portion in response to the hydraulic disconnect mechanism first portion being in its engaged position, and the valve is not operably engaged with the second portion when the first portion is in its disengaged position.

Certain embodiments of the present invention also provide a hydrostatic transmission including a housing partially defining a sump in which is provided hydrostatic fluid, an axial piston pump having a rotatable input shaft, an axial piston motor having a rotatable output shaft, and a center block to which the pump and motor are rotatably connected. The pump and motor are hydraulically connected through first and second fluid conduits extending through the center block, the pump, motor and conduits defining a hydraulic circuit. The center block also has first and second check valves respectively located between the sump and the first and second conduits, and hydrostatic fluid in the sump is automatically drawn into the hydraulic circuit through the valves. A hydraulic bypass mechanism is also provided which includes operatively engaged first and second portions, the first portion extending through the housing and being manually moved by an operator to one of an engaged and a disengaged position. The second portion is located in the sump, and the check valves are held open by the second portion in the first portion engaged position, wherein fluid flow from the conduits to the sump through the check valves is facilitated. The second portion is out of operative engagement with the valves in the first portion disengaged position, wherein fluid flow from the conduits to the sump is prevented by the check valves.

Certain embodiments of the present invention also provide a hydrostatic transmission including a housing having walls at least partially defining an oil-containing sump; a fluid circuit comprising a pump having a rotating input, a motor having a rotatable output, and a conduit through which the pump and motor are in fluid communication, the pump and motor being in operative fluid engagement via pressurized oil in the conduit; and a valve disposed between the conduit and the sump and having open and closed conditions. Oil in the conduit is permitted to flow from the conduit to the sump through the valve when the valve is in its open condition whereby the pump and motor are placed out of operative fluid engagement. Oil in the conduit is prevented from flowing from the conduit to the sump through the valve when the valve is in its closed condition whereby the pump and motor may be maintained in operative fluid engagement. Also provided is a hydraulic bypass mechanism including a manually-moved actuator portion extending through the housing, and an actuated portion disposed in the housing and operatively engaged with the actuator portion and the valve. Changes between the valve conditions are responsive to movement of the actuator portion, the mechanism being elastically biased into either an engaged state wherein the valve is held in its open condition by the actuated portion or a disengaged state wherein the valve is not held in its open condition by the actuated portion.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 7 is a perspective view of the resilient plate portion of the first embodiment hydraulic disconnect mechanism;

FIG. 8 is a perspective view of the rod portion of the first embodiment hydraulic disconnect mechanism;

FIG. 9 is a fragmentary side view of the first embodiment hydraulic disconnect mechanism in a disengaged position, in a direction which is along of the axis of rotation of its rod portion;

FIG. 10 is a fragmentary side view of the hydraulic disconnect mechanism of FIG. 9 in a disengaged position, in a direction which is perpendicular to the axis of rotation of its rod portion;

FIGS. 11 and 12 are fragmentary side views of the hydraulic disconnect mechanism of FIG. 9 in alternative engaged positions, in a direction which is along of the axis of rotation of its rod portion;

FIG. 14 is a perspective view of a second embodiment of a hydraulic disconnect mechanism according to the present invention;

FIG. 15 is a top plan view of the hydraulic disconnect mechanism of FIG. 14;

FIG. 16 is a side elevation of the hydraulic disconnect mechanism of FIG. 14;

FIG. 17 is a fragmentary, sectional side view of a transmission having the second embodiment hydraulic disconnect mechanism, shown in an engaged position;

FIG. 18 is a fragmentary, sectional side view of a transmission having the second embodiment hydraulic disconnect mechanism, shown in one of two disengaged positions.

Figure 1:
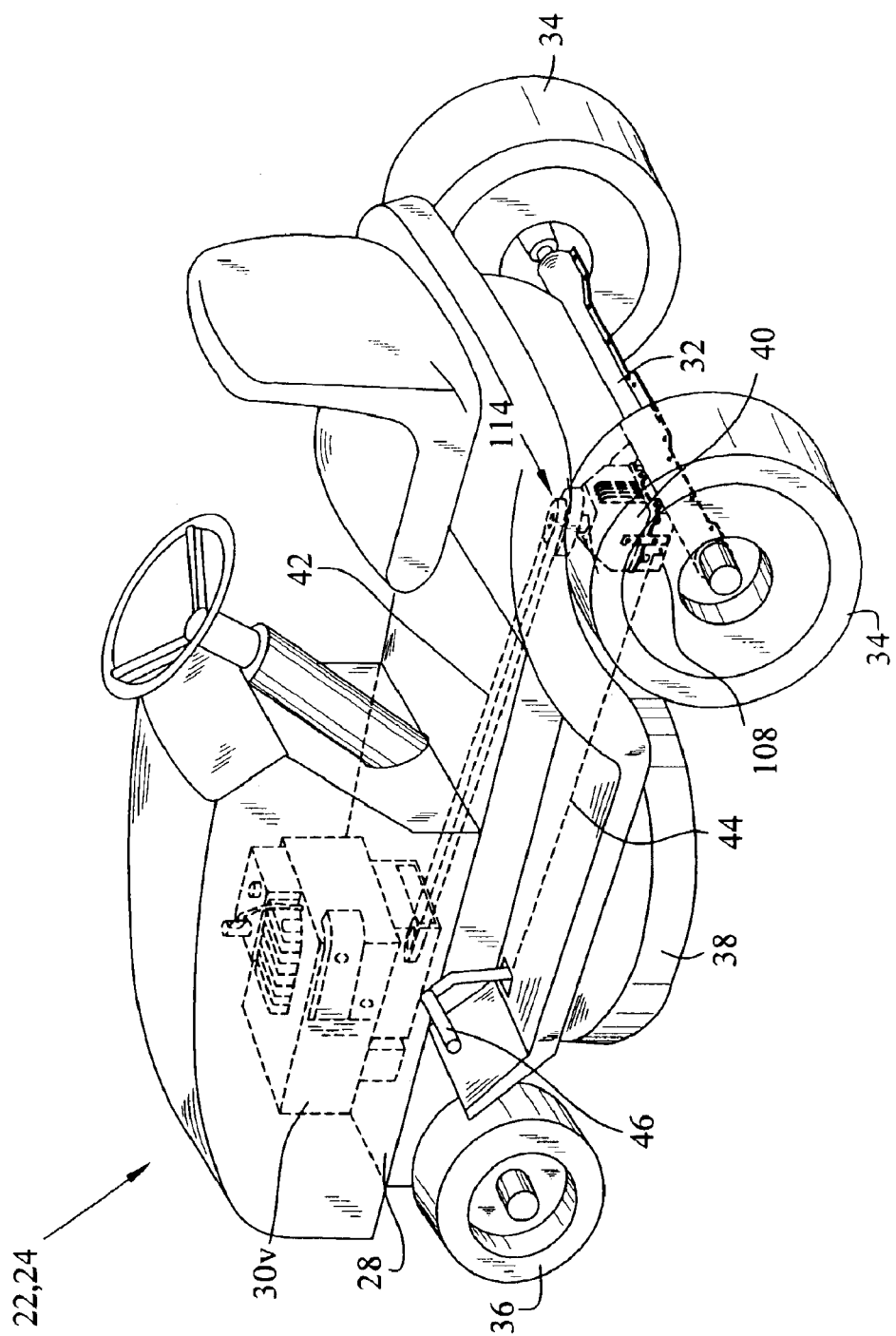
FIG. 1 is a rear perspective view of a lawn tractor having a hydrostatic transaxle according to the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate two embodiments of the inventive hydraulic disconnect mechanism, and such exemplifications are not to be construed as limiting the scope of the invention to thereto.

DETAILED DESCRIPTION OF THE INVENTION

Figure 2:
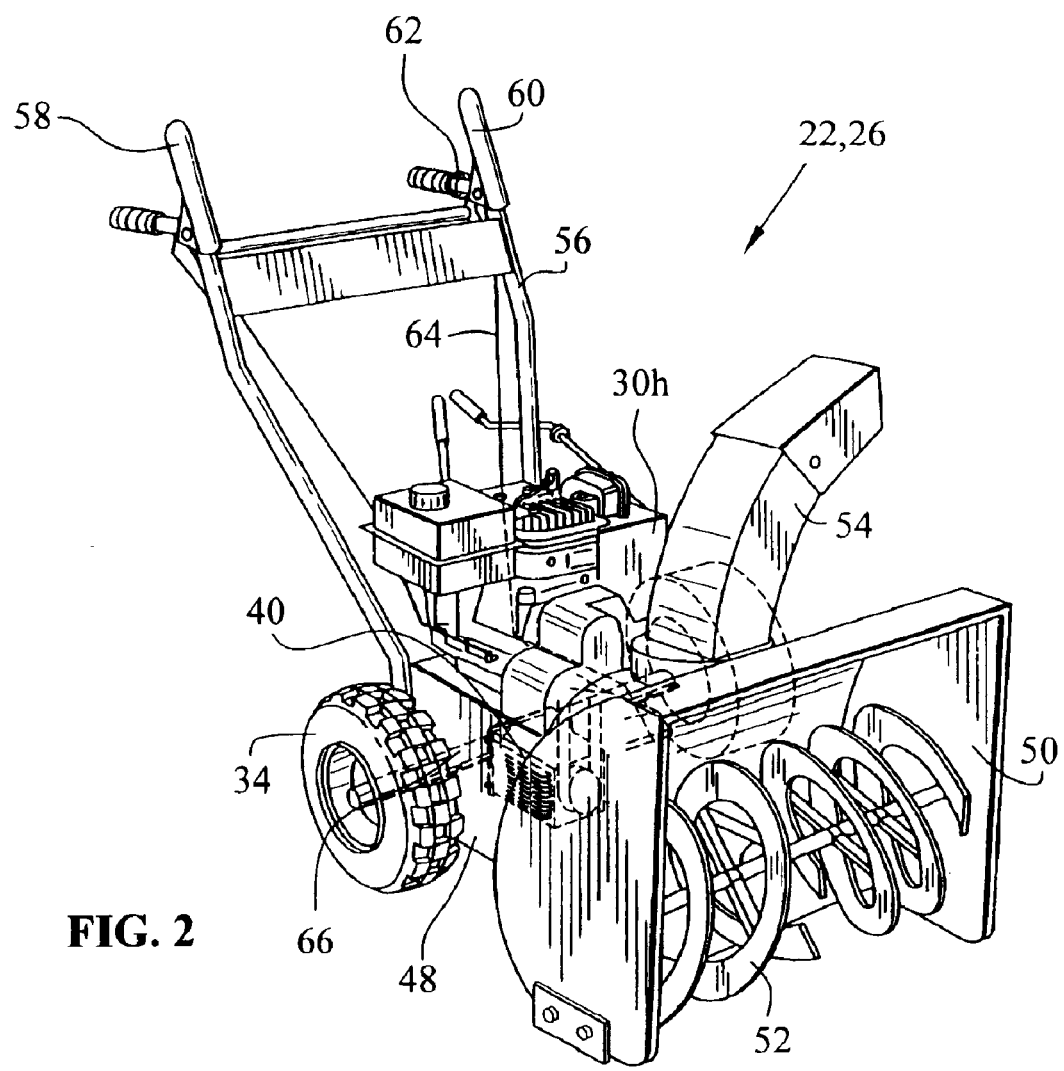
FIG. 2 is a front perspective view of a snow thrower having a hydrostatic transmission according to the present invention.

FIGS. 1 and 2 show riding and walk-behind lawn and garden machines provided with transmissions having hydraulic disconnect mechanisms in accordance with certain embodiments of the present invention. Referring to FIG. 1, tractor or riding lawn mower 24 has frame 28 to which is attached engine 30V having a vertical output shaft which is operatively coupled to hydrostatic transaxle 32, which drives rear wheels 34. Tractor 24 is provided with steerable front wheels 36 and mower deck 38 attached to and located beneath frame 28, and which is provided with a rotating cutting blade (not shown) driven by the engine in any well-known manner.

Transaxle 32 (FIGS. 1 and 3) is provided with hydrostatic transmission module 40 oriented such that its input shaft is vertical and linked to the output shaft of engine 30V through drive belt 42, which engages pulleys rotatably fixed to these shafts. The output speed and direction of transaxle 32 is controlled via linkage 44 connected to foot pedal 46 or via any suitable a manner well known in the art. The engine output and transmission input speeds are typically held substantially constant during operation of the vehicle, and the speed and direction of tractor 24 is controlled by altering the displacement of the hydraulic pump within hydrostatic transmission, through movement of the foot pedal, for example. Apart from the inventive hydraulic bypass mechanism(s), the structures and operations of transaxle 32 and hydrostatic transmission module 40 are generally as set forth in above-mentioned U.S. Pat. No. 6,422,109 and is currently manufactured by Tecumseh Products Company as the Model LTH.

Referring to FIG. 2, snow thrower 26 is provided with frame 48 to which is attached auger assembly 50. Auger assembly 50 is of any suitable type known in the art, and has rotating auger 52 for collecting snow to be removed, and discharge chute 54 through which the removed snow is directed. Handle assembly 56 is attached to frame 48 and provided with auger engagement control 58 and drive engagement control 60 through which belts (not shown) are tensioned to respectively engage the horizontal output shaft of engine 30H with auger 52 and the horizontal input shaft of transmission module 40.

Hydrostatic transmission 40 of snow thrower 26 may be substantially identical to hydrostatic transmission module 40 which is part of transaxle 32 (FIG. 3), and is controlled in a similar way via suitable speed/direction control 62 provided on handle assembly 56 through linkage 64, i.e., by altering the displacement of the hydraulic fluid pump therein. In snow thrower 26, the output shaft of hydrostatic transmission module 40, rotatable fixed to its hydraulic motor, is linked to axle 66 via a chain and sprocket arrangement (not shown) for driving drive wheels 34 at variable speeds in forward and reverse directions.

Figure 3:
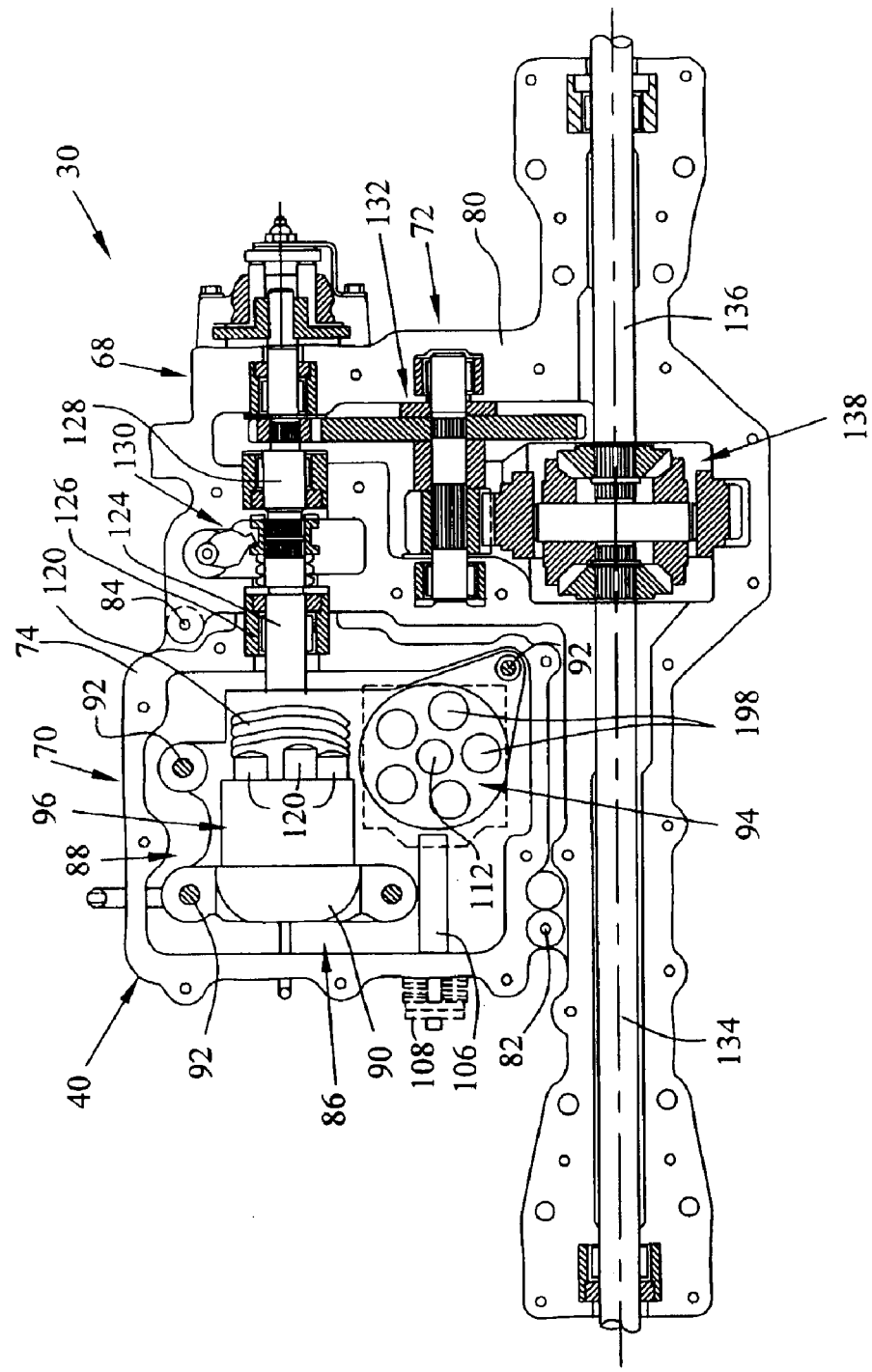
FIG. 3 is a sectional top view of a hydrostatic transaxle having separably-attached modular hydrostatic transmission module provided with a hydraulic disconnect mechanism according to a first embodiment of the present invention.
Figure 4:
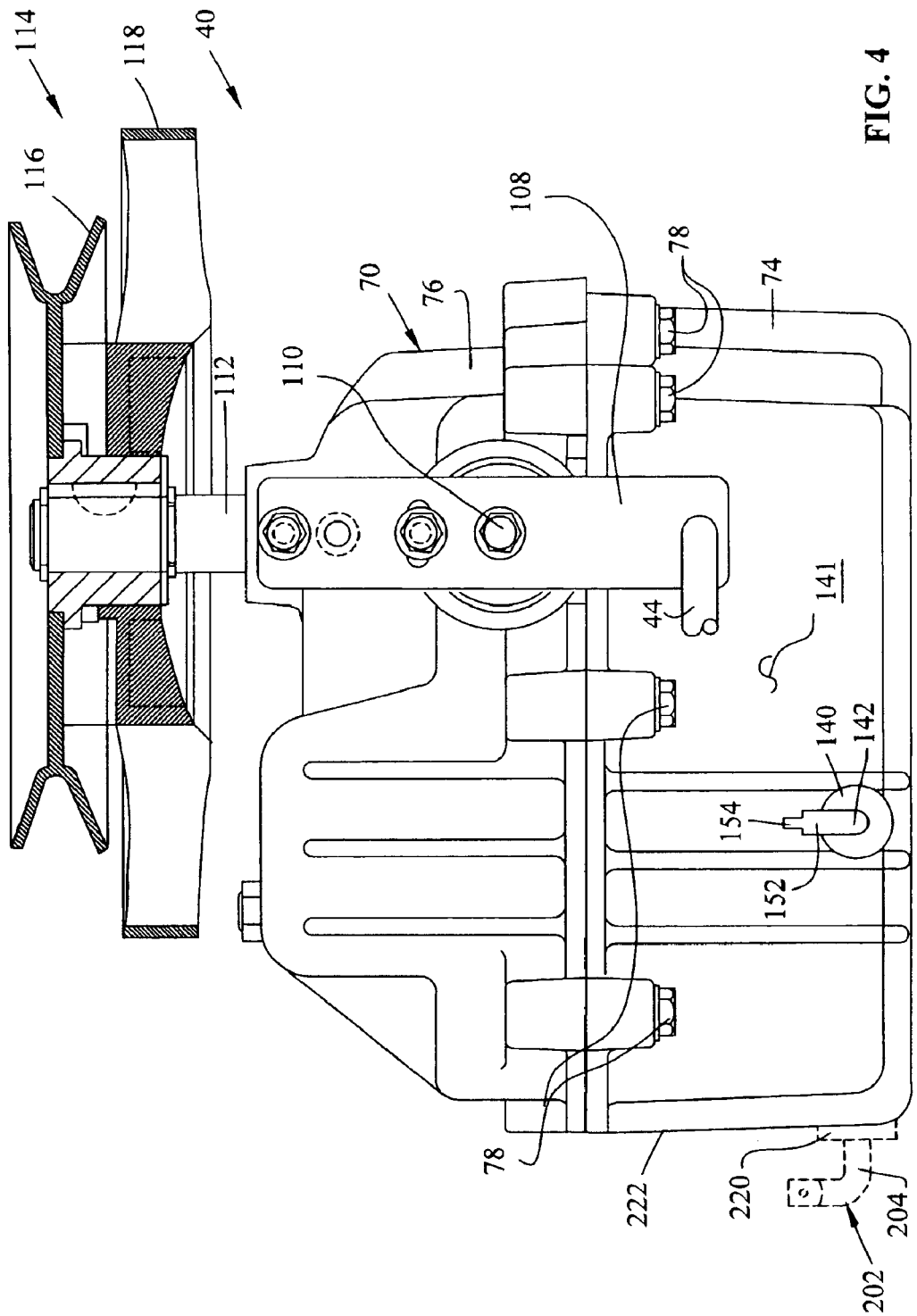
FIG. 4 is a side elevation of the hydrostatic transmission module of the transaxle of FIG. 3, showing the drive pulley assembly in section.

Referring again to FIG. 3, transaxle 32 comprises hydrostatic transmission module 40 and axle drive assembly 68, which are separable attached. Housings 70 and 72 of transmission 40 and axle drive assembly 68, respectively, are each formed of first and second housing halves which interface along a common plane which, in the illustrated view, is substantially horizontal. Transmission module first or lower housing half 74 and second or upper housing half 76 are attached to each other by means of bolts 78 to form housing 70, as shown in FIG. 4. Housing 72 of axle drive unit 68 is similarly formed of first or lower housing half 80 (FIG. 3) and a substantially identical and mirror-imaged second or upper housing half (not shown) attached to each other by bolts. Housings 70 and 72 are bolted together at locations 82 and 84 (FIG. 3). Notably, the hydrostatic transmission module is currently manufactured in mirror-imaged left and right-hand versions, each of which may be assembled to a common, or only slightly-modified version of axle drive assembly 68, to accommodate installations which call for the pump and its control means to be located on either the left or right side of the vehicle. Such flexibility is maintained in transmissions and transaxles according to the present invention.

Figure 5:
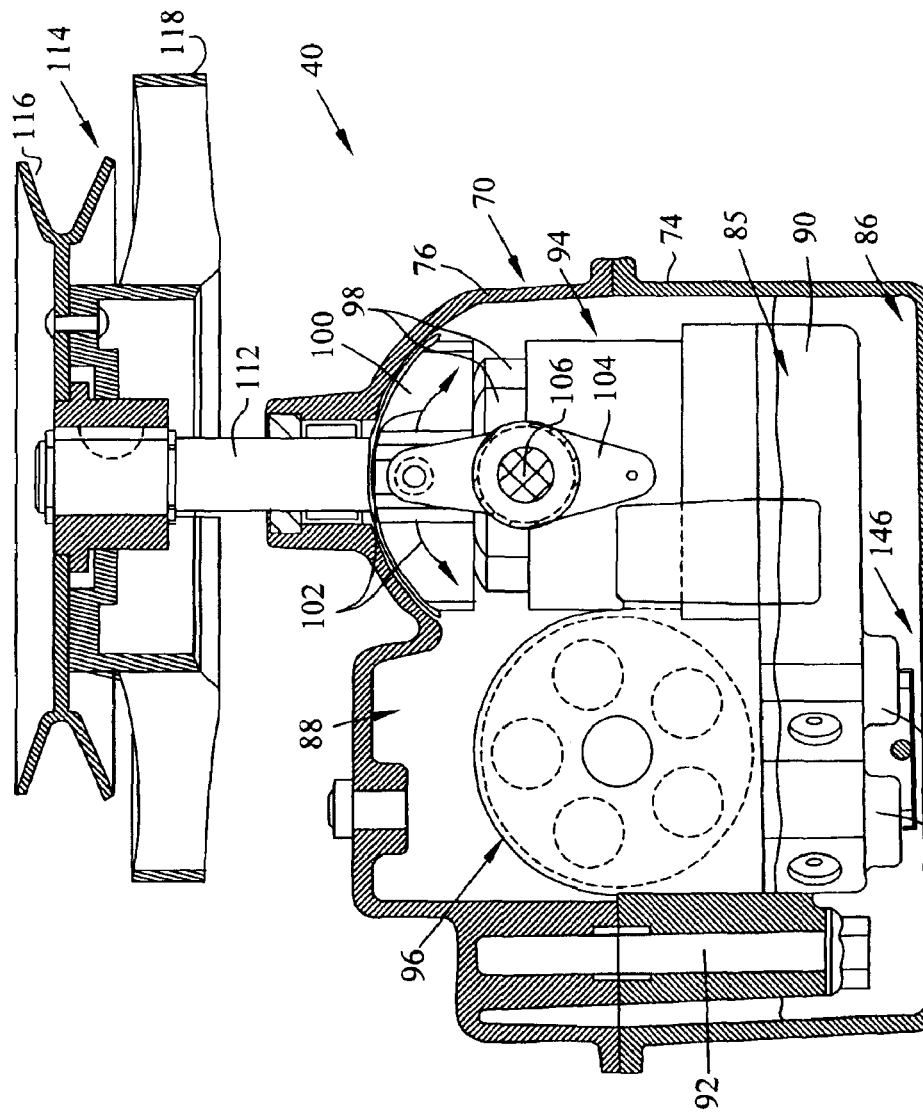
FIG. 5 is a sectional side view of the hydrostatic transmission module of FIG. 4.

With reference to FIG. 5, the interior of hydrostatic transmission module 40 is provided with a suitable quantity of hydrostatic fluid 85 located in sump 86 which is at least partially defined by the walls of housing 70. Also located within housing 70 is axial-piston pump and motor subassembly 88 comprising center section or center block 90, which is attached to second or upper housing half 76 by bolts 92, and to which are mounted rotatable hydraulic pump 94 and motor 96. The surface level of oil 85 is well above check valves 188 (described further hereinafter) provided in the bottom of block 90, thereby allowing makeup fluid to be drawn from the sump into the hydraulic circuit during operation of the pump.

Axial-piston transmissions are well known in the art, with pump 94 having a rotating cylinder in which are located a plurality of bores in which reciprocating pistons 98 are disposed, these pistons being biased by springs into operative engagement with moveable swash plate 100. Pivoting movement of the swash plate in the directions of arrows 102 alters the displacement of pistons 98 for varying the speed and direction of the motor output as described in above-mentioned U.S. Pat. Nos. 6,301,885 and 6,422,109. Swash plate is pivoted through movement of swash plate control member 104 rotatably fixed to swash plate control shaft 106 which extends through upper housing half 76. As shown in FIG. 4, shaft 106 is rotatably fixed to control arm 108 by means of bolt 110, with arm 108 serving as part of the external transmission control and being moved via linkage 44 for positioning the pump swash plate for controlling machine propulsion speed and direction. Central to the rotating cylinder of pump 94 is a bore in which pump input shaft 112 is rotatably fixed, the portion of shaft 112 extending from casing 70 being provided with pulley assembly 114 which comprises pulley 116 and cooling fan 118, pulley 116 being operatively engaged with the output shaft of engine 30V through drive belt 42 (FIG. 1) as described above.

Referring again to FIG. 3, like pump 94, hydraulic motor 96 is provided with a plurality of pistons 120 reciprocatingly disposed in a rotating cylinder and in sliding engagement with swash plate 122. Swash plate 122, however, is fixed, relative to the rotational axis of the motor cylinder, at an angle substantially equivalent in magnitude to the maximum pivoting angle of pump swash plate 100 relative to the rotational axis of the pump cylinder. Thus, the displacement of motor 96 likewise fixed. The motor cylinder is rotatably fixed to transmission or motor output shaft 124, the axis of rotation of which lies in the plane of interface between first and second housing halves 76, 74, and which is rotatably supported by bearing sleeve 126. Bearing sleeve 126 extends outwardly of casing 70, and is received in a recess formed in axle drive unit housing 72 to further secure the relative positions of transmission module 40 and axle drive unit 68.

Within axle drive unit housing 72, a mechanical disconnect mechanism 130 structurally and functionally substantially as described in above-mentioned U.S. Pat. Nos. 6,301, 885 and 6,422,109 provides selective operative engagement between reversible motor output shaft 124 and coaxial gear train input shaft 128. Rotation of gear train input shaft 128 drives gear train 132, which comprises speed reducing gears for reversibly driving axles 134 and 136 through differential unit 138.

As noted above, in walk-behind lawn and garden machines such as snow thrower 26 (FIG. 2), transmission module 40 is provided without axle drive assembly 68, a first drive sprocket (not shown) being rotatably fixed to motor output shaft 124, the axis of rotation of which, as in transaxle 32, is substantially horizontal. Speed reduction is accomplished by fixing a relatively larger second sprocket to axle 66, which is supported in bearings attached to frame 48. The first and second sprockets are rotatably linked with an endless chain. In installations such as machine 26, transmission module 40 may be orientated in a way which is rotated approximately 90° counterclockwise from the orientation shown in FIGS. 4 and 5. So oriented, the axis of rotation of pump input shaft 112 is substantially horizontal and parallel with the output shaft of engine 30H, and hydrostatic fluid 85 within sump 86 has a surface level which is above check valves 188 (described further hereinafter), thereby allowing makeup fluid to be drawn into the hydraulic circuit during pump operation.

The above-mentioned structure and features of transaxle 30 and hydrostatic transmission module 40 are known, and the features provided by the present invention are described hereinafter. Bypass mechanism 146 according to a first embodiment of the present invention has a nonunitary structure, and is comprised primarily of two separate, interacting, moveable elements: First rod portion 144 and second resilient plate portion 170. With reference again to FIG. 4, first half 74 of transmission housing 70 is provided with cylindrical boss 140 in its side wall 141. Cylindrical boss is provided with bore 142 therethrough in which is rotatably disposed rigid, L-shaped rod 144 of hydraulic disconnect mechanism 146, which serves as its actuator.

Figure 6:
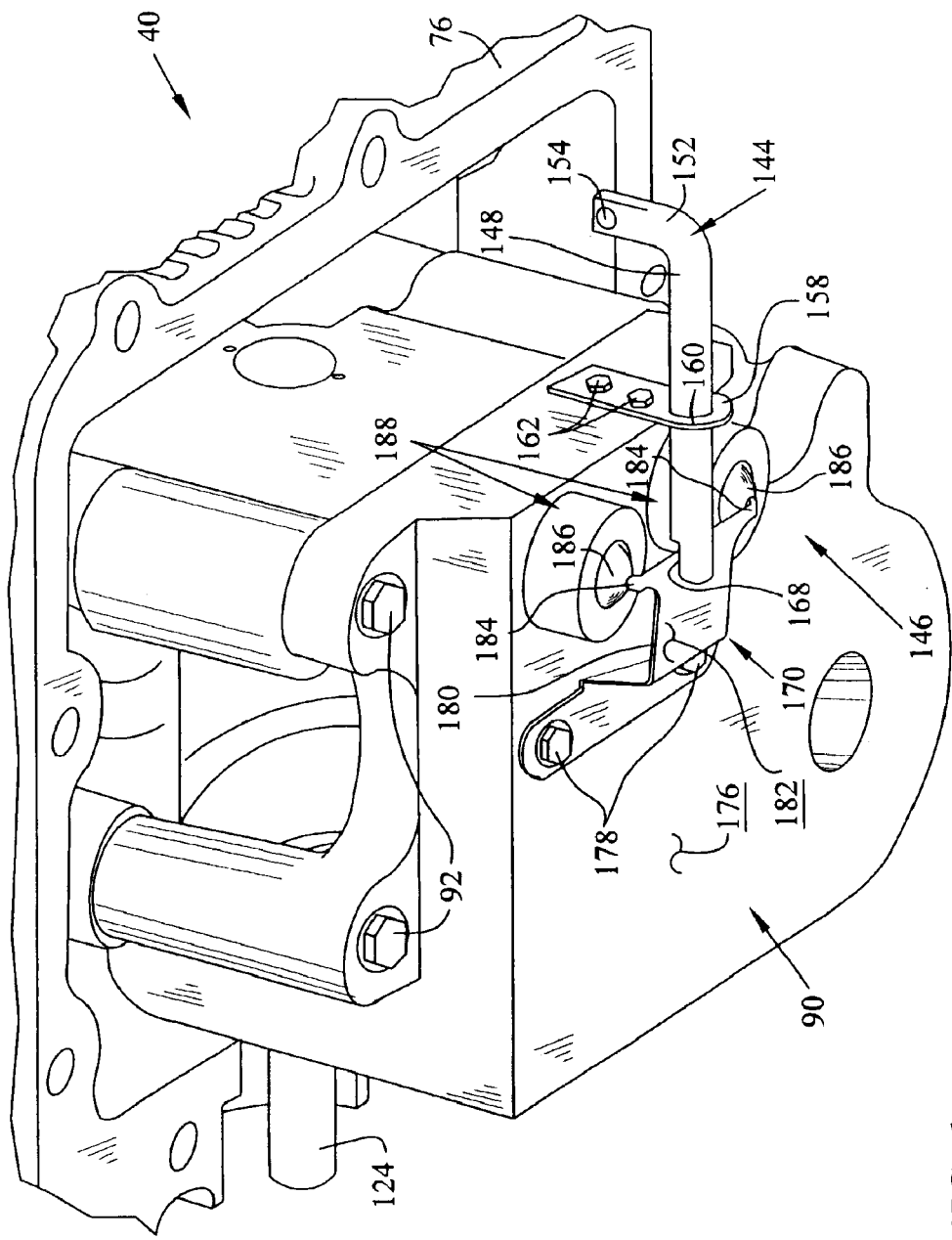
FIG. 6 is fragmentary, lower perspective view of the hydrostatic transmission module of FIG. 4 with the lower housing half removed and showing the first embodiment hydraulic disconnect mechanism in a disengaged position.
Figure 13:
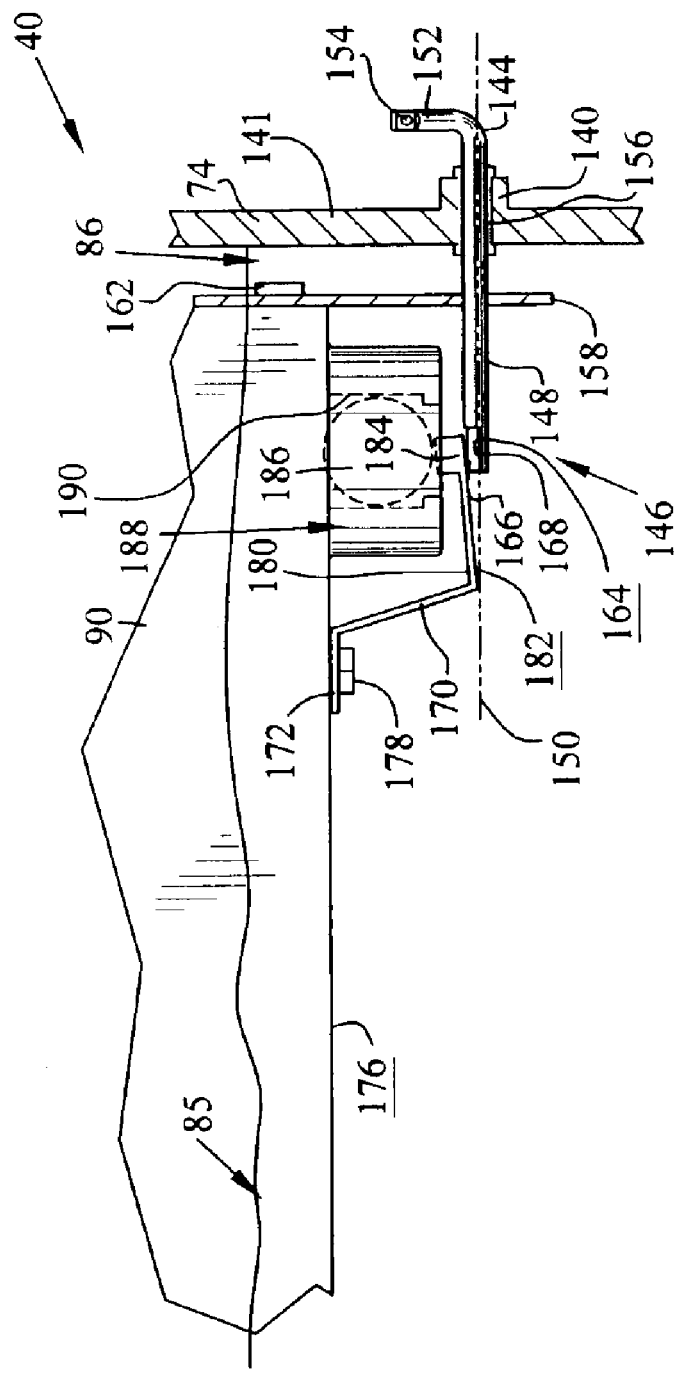
FIG. 13 is a fragmentary side view of the hydraulic disconnect mechanism of FIG. 12 in a disengaged position, in a direction which is perpendicular to the axis of rotation of its rod portion.

Rod 144 includes rotating leg 148, which has axis of rotation 150 coaxial with the central axis of bore 142, and integrally-formed pivoting leg 152 which extends substantially perpendicularly from axis 150. The terminal end of pivoting leg 152 is provided with aperture 154 through which a suitable linkage 192 (FIGS. 9, 11 and 12) may be connected to actuator rod portion 144 for actuating hydraulic disconnect mechanism 146. Alternatively, mechanism 146 may be actuated by moving pivoting leg 152 of the actuator rod directly. Rotating leg 148 is rotatably and axially supported within bore 142 by sealed bearing 156 and, with reference to FIG. 6, may be further rotatably supported by bracket 158 having round aperture 160 through which rod portion 144 extends. Bracket 158 may be attached to center block 90 by means of screws 162.

Resilient plate 170 is shown in FIG. 7 and is stamped of a suitable sheet metal such as, for example, spring steel, and is provided with integral bracket 172 provided with apertures 174 by which the bracket may be securely fixed to bottom surface 176 of center section 90 with screws 178 to render a part of plate 170 substantially immobile relative to housing 70. Plate 170 is provided with moveable leg 180 provided with planar bottom surface 182 which operatively engages rod portion 144. Moveable leg 180 is distanced from bracket 172 by the integral, resilient central portion of plate 170 which joins them. Plate 170 thus has parts which are fixed and moveable relative to the center block, the moveable part being elastically displaceable relative to the fixed part.

Referring to FIG. 8, the terminal end of rotating leg 148 of rod portion 144 is provided with flat surface 164 which defines a plane which is parallel with axis of rotation 150, and in which axis 150 may even lie. Planar bottom surface 182 of resilient plate 170 overlies rod flat surface 164, and when bypass mechanism 146 is in a disengaged state (FIGS.

9 and 10), these two surfaces are substantially parallel and either abut or are separated by a small clearance. In the bypass mechanism's disengaged state the hydrostatic transmission itself may be in an engaged state, i.e., the pump and motor are hydraulically coupled and remain in fluid engagement. In the transmission engaged state, fluid in the transmission's hydraulic circuit is not allowed to escape the hydraulic circuit via check valves 188, and is urged toward one of the pump and motor by the other.

As best shown in FIG. 8, flat surface 164 of rod portion 144 is provided with lateral edges 166 and 168. Rotation of rotating leg 148 about axis 150 from its position shown in FIGS. 9 and 10 to a position shown in either of FIGS. 11 and 12 will cause one of lateral edges 166 and 168 to bear on plate surface 182 and elastically deform plate 170, forcing moveable leg 180 toward center block 90 and bringing the mechanism into an engaged state, during which the hydrostatic transmission itself is in a disengaged state. Thus, the contact between plate surface 182, and edge 166 and/or 168, first and second portions 144, 170 of bypass mechanism 146 are operatively engaged. Thus, rod 144 is the actuator, and plate 170 is actuated thereby. In the transmission's disengaged state, fluid in the transmission's hydraulic circuit is allowed to escape the hydraulic circuit via check valves 188 rather than be urged toward the pump or motor, and the pump and motor are out of fluid engagement and thus hydraulically uncoupled.

Axis 150 extends substantially equidistantly between, and below, the pair of ball check valves 188 which, here and in prior art axial piston hydrostatic transmissions, respectively place the sump in fluid communication with the conduits in center section 90 which hydraulically link the pump and motor. As is well-known with regard to prior art hydrostatic transmissions, and maintained in transmissions according to the present invention, during pump operation makeup hydrostatic fluid is allowed to flow from the sump through a check valve 188 and to the return conduit within block 90 to keep the hydraulic circuit full of fluid. During transmission operation, the pressure of oil 85 in sump 86 may become greater than the pressure of oil in the return conduit of the hydrostatic circuit, through which oil having already forced rotation of the motor flows back to the pump to be re-pressurized. When this pressure differential occurs, hydrostatic fluid 85 is automatically drawn from sump 86 into the hydraulic circuit through the return conduit's check valve, thereby replenishing the circuit with makeup oil.

Moveable leg 180 of resilient plate 170 is provided with a pair of projections 184, each having a tip which is proximate to the surface of the balls 186. In the disengaged state of bypass mechanism 146, projections 184 are in light contact, or out of contact, with balls 186 which are allowed to remain engaged with their seats 194. In the engaged state of mechanism 146, these plate projections operatively engage balls 186 to force them further into ports 190 and off of their seats 194, thereby substantially simultaneously placing the conduits within center section 90 in free fluid communication with sump 86. Thus, any fluid which may be pumped by backdriven motor 96 as a result of the machine being pushed is allowed to bypass the pump and flow to the sump past balls 186 and their seats 194. Hence, machine 22 may be easily moved manually, with any fluid being pumped through the hydrostatic circuit by the backdriven motor being expelled from the conduit(s) and into the sump.

A second embodiment of a hydraulic disconnect mechanism in accordance with the present invention is shown in FIGS. 14 through 16. Unitary hydraulic disconnect mechanism 202 comprises two axially-attached portions: First rod portion 204, and second wire portion 206. First and second portions 204, 206 are operatively engaged by being rotatably fixed together at their joint. Actuator rod 204 is rigid and substantially L-shaped, and includes rotating and pivoting legs 210, 212, respectively, with rotating leg 210 extending through lower casing half 74 and having axis of rotation 208. With bypass mechanism installed, check valves 188 lie substantially along axis 208. Wire 206 extends longitudinally in a direction substantially parallel with axis 208, and projections 216 formed therein are each disposed proximate to one of balls 186. Elongate wire 206 may be a drawn, resilient spring steel wire with stiff projections 216 formed therein which operably engage balls 186 to open valves 188 when mechanism 202 is in its engaged state. As described above, in the bypass mechanism engaged state, the transmission itself is in a disengaged state.

Referring to FIGS. 4, 17 and 18, boss 220 may provided on side wall 222 of first housing half 74, with rotating leg 210 of rod 204 being supported therein by means of sealed bearing 156. Pivoting leg 212 of rod 204 extends perpendicularly from axis 208 and its terminal end is provided with aperture 214 through which a linkage similar to above-described linkage 192 may be connected to rod portion 204 for actuating hydraulic disconnect mechanism 202. Alternatively, mechanism 202 may be actuated by moving pivoting leg 212 directly.

The end of wire 206 distant from actuator rod 204 is formed to extend substantially perpendicularly relative to the overall length of wire 206, and rotation of the wire about its elongate axis elastically deforms the wire near this end. The straight, terminal end portion 218 of wire 206, which extends laterally in a direction perpendicular to axis 208, is fixed relative to transmission housing 70 in any suitable way, whereby a part of wire 206 is rendered substantially immobile relative to the housing. For example, referring to FIGS. 17 and 18, the interior wall of housing half 74 located opposite center block surface 176 may be provided with integral cast portion 224 in which is provided slot 226 in which wire portion end 218 is fixedly received. Alternatively, means may be provided for similarly retaining end 218 to center section 90. Wire 206 thus has parts which are fixed and moveable relative to the center block, the moveable part being elastically displaceable relative to the fixed part.

Figure 19:
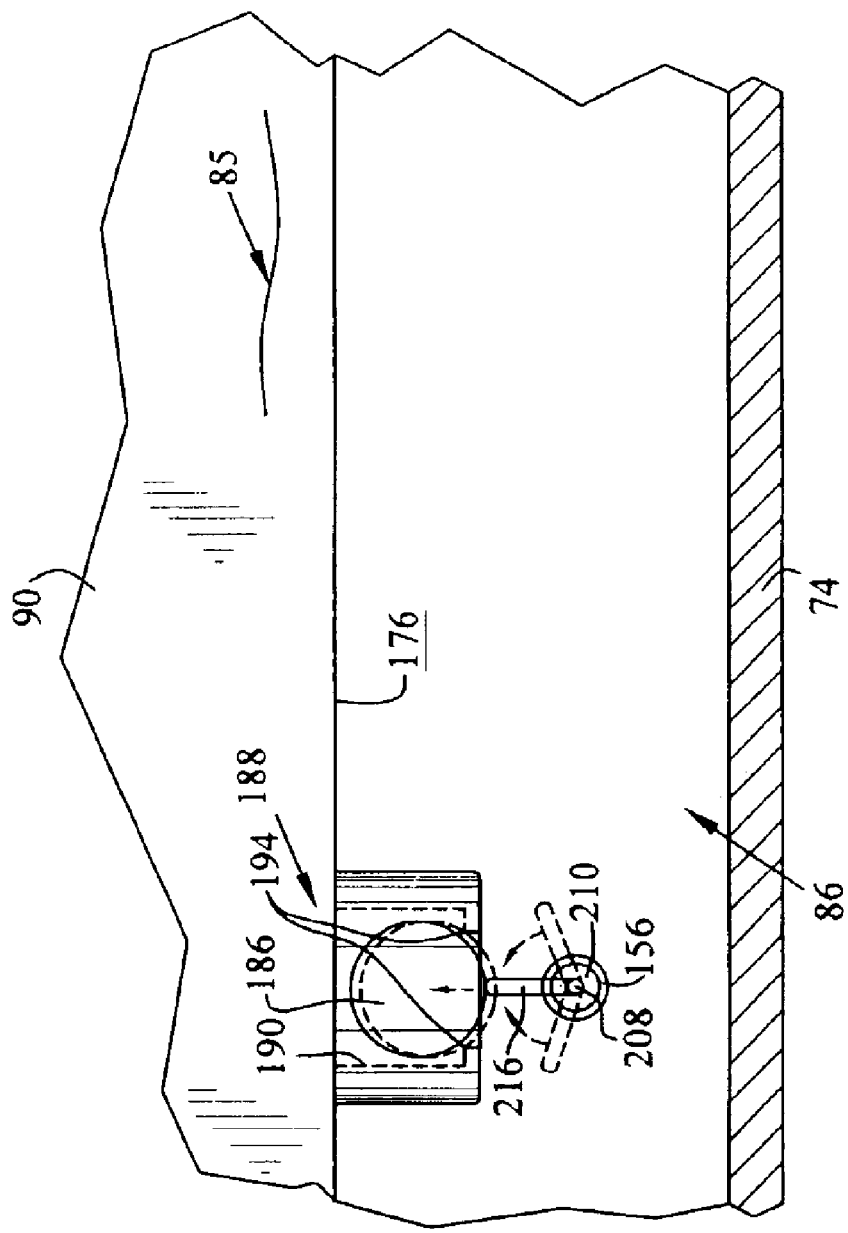
FIG. 19 is a view of the hydraulic disconnect mechanism of FIGS. 17 and 18, which is in a direction along its axis of rotation, showing it in an engaged position and in two alternative disengaged positions.

Rotation of rotating leg portion 210 of the actuator rod in either direction about axis 208 elastically deforms wire portion 206 and moves projections 216 to one of two alternative positions indicated in dashed lines in FIG. 19, wherein the bypass mechanism has a disengaged state in which balls 186 are allowed to seal against their seats 194. Thus, rod 204 is the actuator, and wire 206 is actuated thereby. As described above, in the bypass mechanism disengaged state, the transmission itself may be in an engaged state.

Unlike first embodiment hydraulic disconnect mechanism 146, which is mechanically biased into a disengaged position (FIGS. 9 and 10), and which may be moved against the spring force provided by plate 170 into alternative engaged positions shown in FIGS. 11 and 12, the depicted version of second embodiment hydraulic disconnect mechanism 202 is mechanically biased into an engaged position (FIGS. 17 and 19) in which projections 216 engage balls 186 and keep them from sealing against their seats 194, thereby placing the conduits and sump in fluid communication substantially simultaneously. Mechanism 202 is then moved against the spring force provided by wire portion 206 into one of two alternative disengaged positions (FIGS. 18 and 19). Those skilled in the art will now recognize, however, that mechanism 202 may be easily altered to be biased into a disengaged state and moved against the spring force into an engaged position in which balls 186 are substantially simultaneously lifted off their seats. The first and second embodiment mechanisms thus provides substantial flexibility in how bypass linkages may be designed and/or packaged.

Further, because the respective rotating legs 148 and 210 of first and second embodiment bypass mechanisms 146 and 202 are located in different walls of housing 70, these mechanisms provide additional flexibility in packaging inventive transmissions in a variety of lawn and garden machines.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A hydrostatic transmission comprising:
  a hydraulic pump having an input;
  a hydraulic motor having an output;
  a center section to which said pump and motor are rotatably mounted, said center section being provided with a conduit through which said pump and motor are in fluid communication, said pump and motor being hydraulically coupled when said pump and motor are in operative fluid engagement with each other through fluid in said conduit, said center section having a valve with open and closed conditions;
  a housing in which said pump, motor and center section are disposed, said housing having a plurality of walls which at least partially define a sump, said conduit being in fluid communication with said sump through said valve when said valve is open, during which said pomp and motor are out of operative fluid engagement with each other, said conduit being out of fluid communication with said sump through said valve when said valve is closed; and
  a hydraulic disconnect mechanism comprising:
    a first portion which is moveable relative to said center section and extends through a said housing wall, said first portion being substantially rigid and having engaged and disengaged positions;
    a second portion operatively engaged with said first portion and which is moveable relative to said center section, said second portion being at least partially resilient and having a part which is substantially immobile relative to said housing; and
  wherein said valve is operably engaged with and opened by said hydraulic disconnect mechanism second portion in response to said hydraulic disconnect mechanism first portion being in its said engaged position, and said valve is not operably engaged with said second portion when said first portion is in its said disengaged position.

2. The transmission of claim 1, wherein said hydraulic disconnect mechanism is actuated from a location outside of said transmission housing via movement of its said first portion.

3. The transmission of claim 2, wherein said hydraulic disconnect mechanism first portion comprises a rotating leg having an axis of rotation, and the actuating movement of said first portion is a rotational movement of said rotating leg about said axis of rotation.

4. The transmission of claim 3, wherein said hydraulic disconnect mechanism first portion further comprises a pivoting leg extending from said rotating leg, and the actuating movement of said first portion is a pivoting movement of said pivoting leg about said axis of rotation.

5. The transmission of claim 2, wherein said first portion has an axis of rotation, and the actuating movement of said first portion is a rotational movement of said first portion about said axis of rotation.

6. The transmission of claim 1, wherein said hydraulic disconnect mechanism first portion is mechanically biased into one of its said engaged and disengaged positions.

7. The transmission of claim 1, wherein said hydraulic disconnect mechanism first and second portions are separate, interacting elements.

8. The transmission of claim 7, wherein said first portion is a rod having an axis of rotation and a lateral edge, said rod being rotatable about said axis of rotation between its said engaged and disengaged positions, and said Second portion is a resilient plate which is moved by said lateral edge into operative engagement with said valve in response to rotation of said first portion from its said disengaged position to its said engaged position.

9. The transmission of claim 7, wherein said first portion is a rod having an axis of rotation and a substantially planar surface which defines an edge, said axis of rotation and said planar surface being substantially parallel, and said second portion is a resilient plate attached to said center section and having a planar surface which overlies said rod planar surface, said plate and rod planar surfaces being substantially parallel in said rod disengaged position, said rod edge bearing against said plate planar surface and elastically deforming said plate in said rod engaged position.

10. The transmission of claim 1, wherein said center section is provided with a pair of said conduits through which said pump and motor are in fluid communication, said pump and motor being hydraulically coupled when said pump and motor are in operative fluid engagement with each other through fluid in one of said conduits, and a pair of said valves, each said valve having open and closed conditions, each said conduit respectively being in fluid communication with said sump through a said valve when that said valve is open, during which said pump and motor are out of fluid engagement with each other through fluid in the respective conduit.

11. The transmission of claim 10, wherein each of said pair of valves is operatively engaged with and opened by said hydraulic disconnect mechanism second portion in response to said hydraulic disconnect mechanism first portion being in its engaged position.

12. The transmission of claim 11, wherein both of said pair of valves are simultaneously operatively engaged with and opened by said hydraulic disconnect mechanism second portion in response to said hydraulic disconnect mechanism first portion being in its engaged position.

13. The transmission of claim 11, wherein said hydraulic disconnect mechanism second portion is provided with a pair of projections, each of which is operatively engaged with a said valve in said valve open condition.

14. The transmission of claim 1, wherein said hydraulic disconnect mechanism first and second portions are rotatably fixed together.

15. The transmission of claim 14, wherein said first portion is a rod having an axis of rotation, said rod being rotatable about said axis of rotation between its said engaged and disengaged positions, and said second portion is a resilient wire having a projection formed therein which is moved out of operative engagement with said valve in response to rotation of said first portion from its said engaged position to its said disengaged position.

16. The transmission of claim 15, wherein said wire extends longitudinally in a direction substantially parallel with said axis of rotation.

17. The transmission of claim 15, wherein said wire has a terminal end portion which is fixed relative to said housing.

18. The transmission of claim 1, wherein said transmission is a transaxle, and further comprises an axle operatively engaged with said motor output.

19. The transmission of claim 1, wherein said valve is biased into its said closed condition.

20. A hydrostatic transmission comprising:

a housing partially defining a sump in which is provided hydrostatic fluid;

an axial piston pump having a rotatable input shaft;

an axial piston motor having a rotatable output shaft;

a center block to which said pump and motor are rotatably connected, said pump and motor being hydraulically connected through first and second fluid conduits extending through said center block, said pump, motor and conduits defining a hydraulic circuit, said center block further having first and second check valves respectively located between said sump and said first and second conduits, hydrostatic fluid in said sump being automatically drawn into said hydraulic circuit through said valves; and a hydraulic bypass mechanism comprising operatively engaged first and second portions, said first portion extending through said housing and being manually moved by an operator to one of an engaged and a disengaged position, said second portion being located in said sump said second portion having a part which is substantially fixed relative to said center block and a part which is movable relative to said center block, said check valves being held open by said second portion in said first portion engaged position wherein fluid flow from said conduits to said sump through said check valves is facilitated, said second portion being out of operative engagement with said valves in said first portion disengaged positron wherein fluid flow from said conduits to said sump is prevented by said check valves, wherein said hydraulic bypass mechanism first portion is biased into its said engaged position.

21. A hydrostatic transmission comprising:

a housing partially defining a sump in which is provided hydrostatic fluid;

an axial piston pump having a rotatable input shaft;

an axial piston motor having a rotatable output shaft;

a center block to which said pump and motor are rotatably connected, said pump and motor being hydraulically connected through first and second fluid conduits extending through said center block, said pump, motor and conduits defining a hydraulic circuit, said center block further having first and second check valves respectively located between said sump and said first and second conduits, hydrostatic fluid in said sump being automatically drawn into said hydraulic circuit through said valves; and a hydraulic bypass mechanism comprising a first portion operatively engaged with a unitary second portion, said first portion extending through said housing and being manually moved by an operator to one of an engaged and a disengaged position, said check valves being held open by said second portion in said first portion engaged position wherein fluid flow from said conduits to said sump through said check valves is facilitated, said second portion being out of operative engagement with said valves in said first portion disengaged position wherein fluid flow from said conduits to said sump is prevented by said check valves, wherein said hydraulic bypass mechanism second portion is elastically deformable, said second portion being elastically deformed when displaced by said hydraulic bypass mechanism first portion.

22. The transmission of claim 21, wherein said second portion comprises a resilient plate.

23. The transmission of claim 21, wherein said second portion comprises a resilient wire.

24. The transmission of claim 21, wherein said hydraulic bypass mechanism second portion is provided with first and second projections which are respectively moved into and out of engagement with said first and second check valves.

25. A hydrostatic transmission comprising:

a housing partially defining a sump in which is provided hydrostatic fluid;

an axial piston pump having a rotatable input shaft;

an axial piston motor having a rotatable output shaft;

a center block to which said pump and motor are rotatably connected, said pump and motor being hydraulically connected through first and second fluid conduits extending through said center block, said pump, motor and conduits defining a hydraulic circuit, said center block further having first and second check valves respectively located between said sump and said first and second conduits, hydrostatic fluid in said sump being automatically drawn into said hydraulic circuit through said valves; and a hydraulic bypass mechanism comprising operatively engaged first and second portions, said first portion extending through said housing and being manually moved by an operator to one of an engaged and a disengaged position, said second portion being located in said sump, said check valves being held open by said second portion in said first portion engaged position wherein fluid flow from said conduits to said sump through said check valves is facilitated, said second position being out of operative engagement with said valves in said first portion disengaged position wherein fluid flow from said conduits to said sump is prevented by said check valves, wherein said hydraulic bypass mechanism second portion is provided with first and second projections which are respectively moved into and out of engagement with said first and second check valves, wherein said hydraulic bypass mechanism second portion has a part which is fixed relative to said center block, and a part which is moveable relative to said center block, said second portion moveable part being elastically displaceable relative to said second portion fixed part, said first and second projections being located on said second portion moveable part.

26. The transmission of claim 25, wherein said hydraulic bypass mechanism first portion is manually moved by the operator through a linkage connected to said first portion.

27. The transmission of claim 25, wherein said hydraulic bypass mechanism first portion comprises a rotating leg having an axis of rotation, said first portion being rotated about its said axis between its said engaged and disengaged positions.

28. The transmission of claim 25, wherein said hydraulic bypass mechanism fruit portion is biased into its said disengaged position.

29. The transmission of claim 25, wherein said hydraulic bypass mechanism first and second portions are separable elements.

30. The transmission of claim 29, wherein said hydraulic bypass mechanism first portion is provided with a surface defining an edge, said hydraulic bypass mechanism second portion being displaced by said edge as said first portion is moved from its said disengaged position to its said engaged position.

31. The transmission of claim 25, wherein said second portion comprises a resilient plate.

32. The transmission of claim 25, wherein said second portion comprises a resilient wire.

33. A hydrostatic transmission comprising:

a housing partially defining a sump in which is provided hydrostatic fluid;

an axial piston pump having a rotatable input shaft;

an axial piston motor having a rotatable output shaft;

a center block to which said pump and motor are rotatably connected, said pump and motor being hydraulically connected through first and second fluid conduits extending through said center block, said pump, motor and conduits defining a hydraulic circuit, said center block further having first and second check valves respectively located between said sump and said first and second conduits, hydrostatic fluid in said sump being automatically drawn into said hydraulic circuit through said valves; and a hydraulic bypass mechanism comprising a first portion operatively engaged with a unitary second portion, said first portion extending through said housing and being manually moved by an operator to one of an engaged and a disengaged position, said second portion being located in said sump, said check valves being held open by said second portion in said first portion engaged position wherein fluid flow from said conduits to said sump through said check valves is facilitated, said second portion being out of operative engagement with said valves in said first portion disengaged position wherein fluid flow from said conduits to said sump is prevented by said check valves, wherein said hydraulic bypass mechanism second portion is provided with first and second projections which are respectively moved into and out of engagement with said first and second check valves, wherein said hydraulic bypass mechanism second portion is a resilient plate having said first and second projections formed therein.

34. A hydrostatic transmission comprising:

a housing partially defining a sump in which is provided hydrostatic fluid;

an axial piston pump having a rotatable input shaft;

an axial piston motor having a rotatable output shaft;

a center block to which said pump and motor are rotatably connected, said pump and motor being hydraulically connected through first and second fluid conduits extending through said center block, said pump, motor and conduits defining a hydraulic circuit, said center block further having first and second check valves respectively located between said sump and said first and second conduits, hydrostatic fluid in said sump being automatically drawn into said hydraulic circuit through said valves; and a hydraulic bypass mechanism comprising operatively engaged first and second portions, said first portion extending through said housing and being manually moved by an operator to one of an engaged and a disengaged position, said second portion being located in said sump, said check valves being held open by said second portion in said first portion engaged position wherein fluid flow from said conduits to said sump through said check valves is facilitated, said second portion being out of operative engagement with said valves in said first portion disengaged position wherein fluid flow from said conduits to said sump is prevented by said check valves, wherein said hydraulic bypass mechanism second portion is provided with first and second projections which are respectively moved into and out of engagement with said first and second check valves, wherein said hydraulic bypass mechanism second portion is a resilient wire having said first and second projections formed therein.

35. A hydrostatic transmission comprising:

a housing having walls at least partially defining a hydrostatic fluid-containing sump;

a fluid circuit comprising a pump having a rotating input, a motor having a rotatable output, and a conduit through which said pump and motor are in fluid communication, said pump and motor being in operative fluid engagement via pressurized hydrostatic fluid in said conduit;

a valve disposed between said conduit and said sump and having open and closed conditions, hydrostatic fluid in said conduit being permitted to flow from said conduit to said sump through said valve when said valve is in its said open condition whereby said pump and motor are placed out of operative fluid engagement, hydrostatic fluid in said conduit being prevented from flowing from said conduit to said sump through said valve when said valve is in its said closed condition whereby said pump and motor may be maintained in operative fluid engagement; and a hydraulic bypass mechanism comprising a manually-moved actuator portion extending through said housing, and a unitary, resilient actuated portion disposed in said housing and operatively engaged with said actuator portion and said valve, changes between said valve conditions being responsive to movement of said actuator portion, said mechanism being elastically biased into one of an engaged state wherein said valve is held in its said open condition by said actuated portion and a disengaged state wherein said valve is not held in its said open condition by said actuated portion.

36. The transmission of claim 35, wherein said actuated portion comprises a resilient plate.

37. The transmission of claim 35, wherein said actuated portion comprises a resilient wire.

* * * * *

UNITED STATES PATENT AND TRADEMARK OFFICE
CERTIFICATE OF CORRECTION

PATENT NO. : 6,895,748 B2
DATED : May 24, 2005
INVENTOR(S) : Douglas G. Williams et al.

It is certified that error appears in the above-identified patent and that said Letters Patent is hereby corrected as shown below:

Column 11,
Line 41, delete "pomp" and insert -- pump --.

Column 12,
Line 22, delete "Second" and insert -- second --.

Column 13,
Line 39, after "sump", insert -- , --.
Line 47, delete "positron" and insert -- position --.

Signed and Sealed this

Thirteenth Day of September, 2005

JON W. DUDAS
*Director of the United States Patent and Trademark Office*